Oct. 25, 1955 A. W. EXCELL 2,721,512

RECORD CONTROLLED STATISTICAL MACHINES

Filed Nov. 25, 1952 3 Sheets-Sheet 1

INVENTOR
ARTHUR WILLIAM EXCELL
BY

Oct. 25, 1955 A. W. EXCELL 2,721,512

RECORD CONTROLLED STATISTICAL MACHINES

Filed Nov. 25, 1952 3 Sheets-Sheet 2

INVENTOR
ARTHUR WILLIAM EXCELL
BY

Oct. 25, 1955 A. W. EXCELL 2,721,512

RECORD CONTROLLED STATISTICAL MACHINES

Filed Nov. 25, 1952 3 Sheets-Sheet 3

Inventor
ARTHUR W. EXCELL
By [signature]
Attorney 2,721,512
Patented Oct. 25, 1955

2,721,512

RECORD CONTROLLED STATISTICAL MACHINES

Arthur William Excell, Thornton Heath, England, assignor to Powers-Samas Accounting Machines Limited, London, England, a British company Application November 25, 1952, Serial No. 322,401

Claims priority, application Great Britain January 2, 1952

13 Claims. (Cl. 101—93)

This invention relates to record controlled statistical machines of the kind which incorporates type-characters for effecting a printed record of data sensed on a record such, for example, as a perforated record card.

According to the present invention there is provided for a record controlled statistical machine incorporating type characters for effecting a printed record of data sensed from a record, type character selecting apparatus comprising a column of settable stops for actuation by impulses initiated by a record sensing operation and traversed by a type character selector member to be arrested thereby in character selecting position, characterised by guide means co-operating with said stops to effect swinging movements thereof and to position a stop for engagement by the selector member, and control means actuated by impulses initiated by a record sensing operation and cooperating with the guide means selectively to dispose a stop in one of a plurality of selector member arresting positions thereof.

Figure 1:
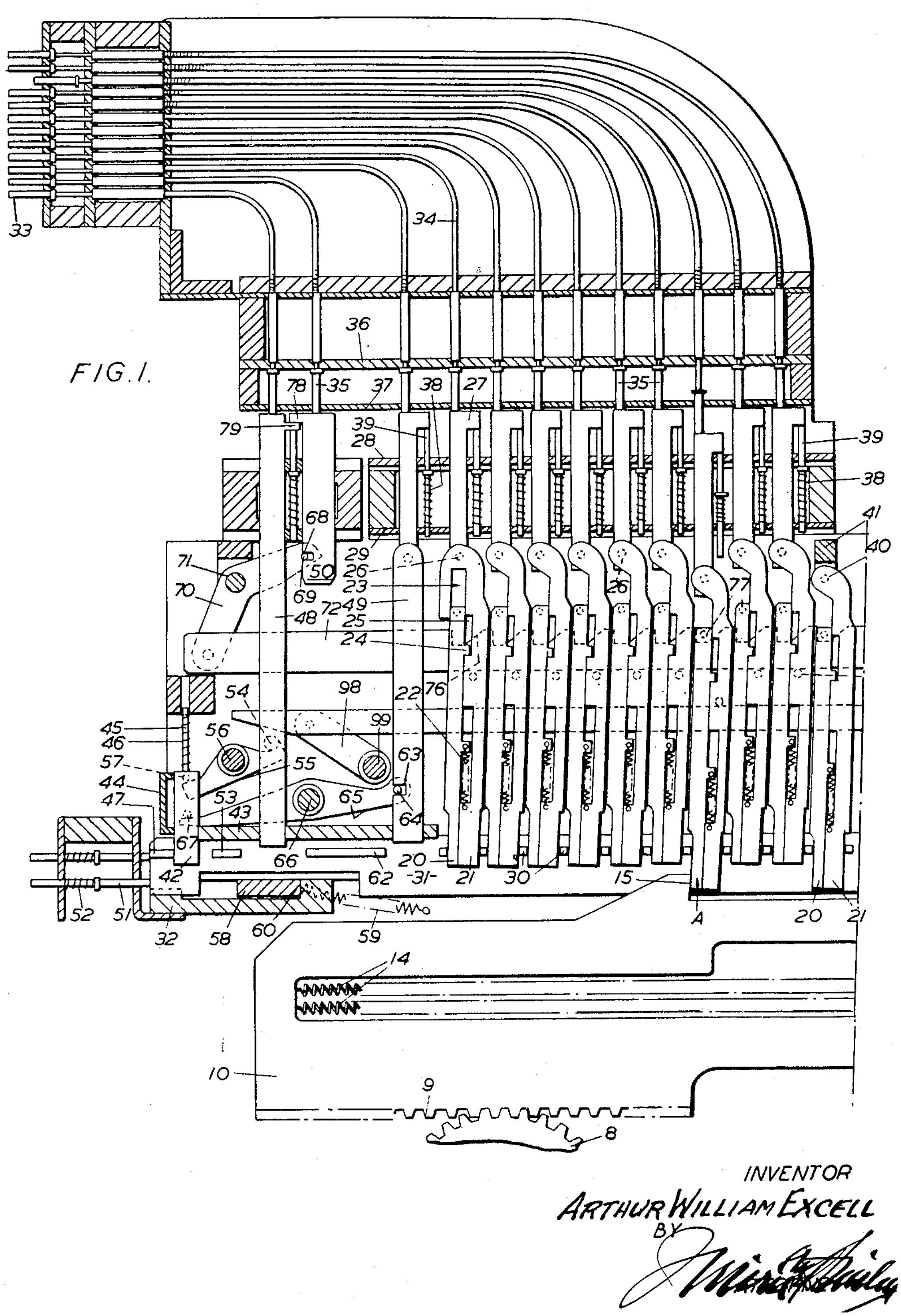
Figure 2:
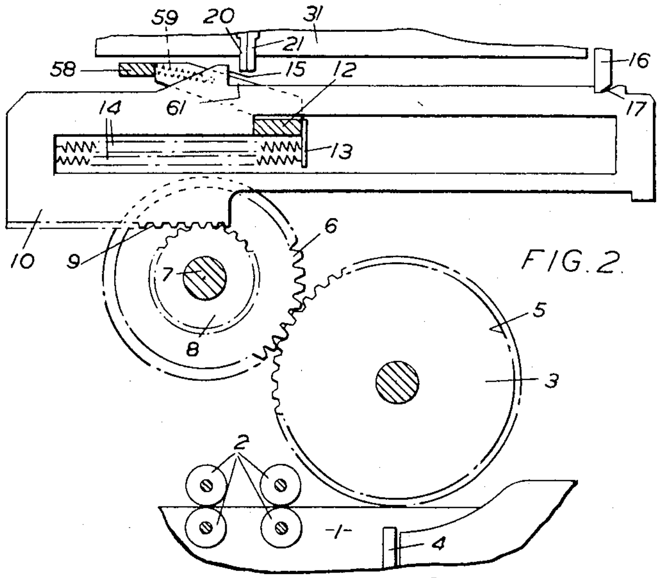
Figure 1A:
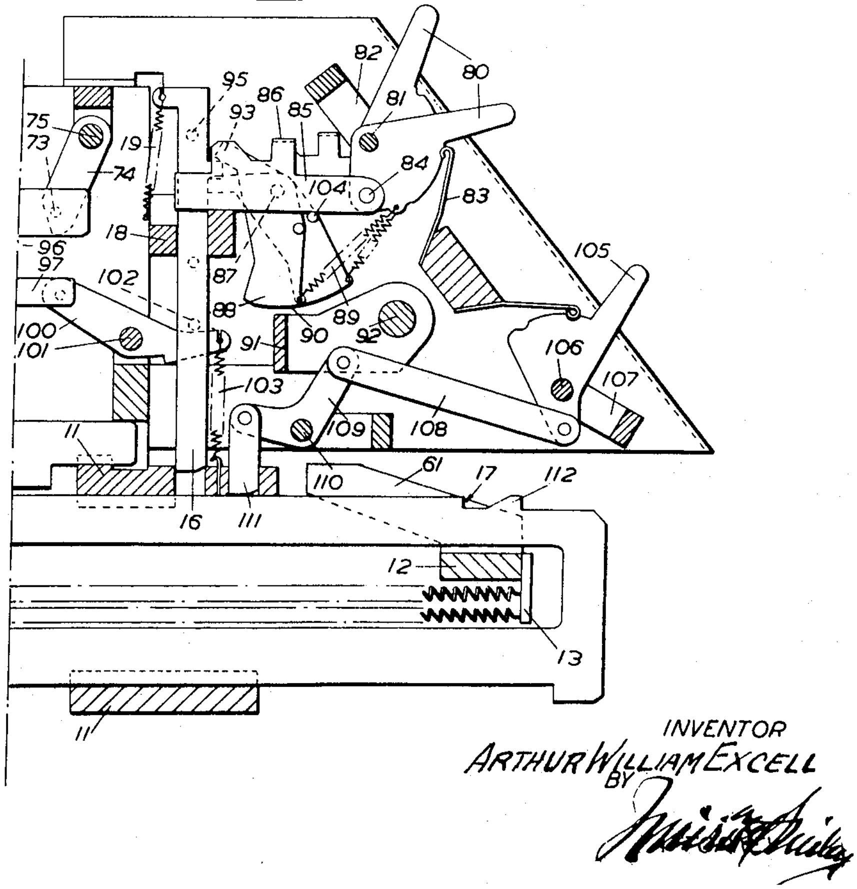
Figures 3, 4, 5, 6, 7:
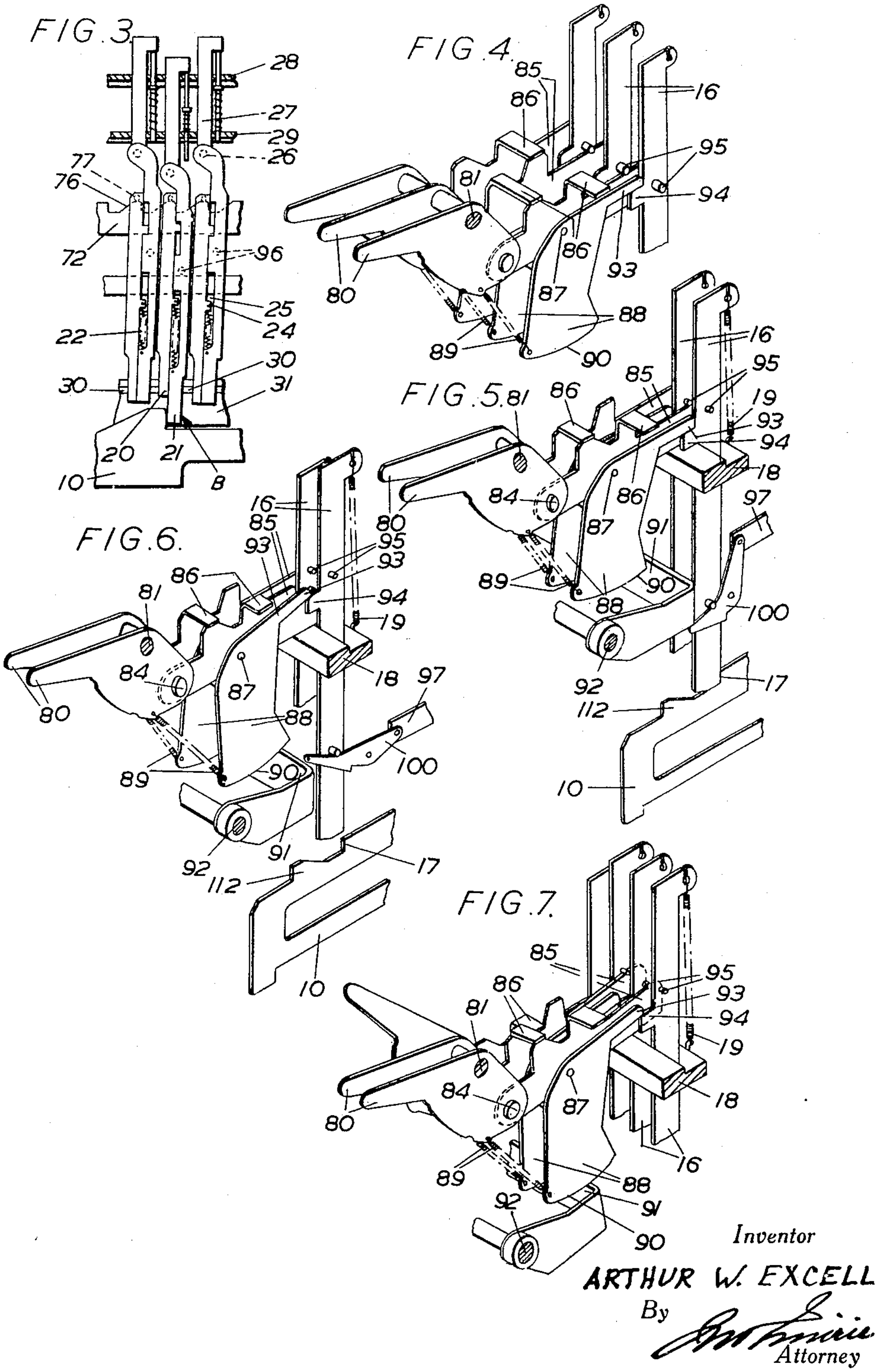

In order that the invention may be clearly understood one embodiment thereof will now be described, by way of example, with reference to the accompanying diagrammatic drawings in which:

Figures 1 and 1A together are a section through a type character selecting apparatus according to the invention and illustrates the mechanism employed for selecting characters sensed from one column of a statistical record card, Figure 2 is a sectional elevation, to a reduced scale, showing a part of the mechanism illustrated in Figure 1 and illustrating the connection thereof to type-wheels bearing type characters, Figure 3 shows a part of the mechanism illustrated in Figure 1, but with certain of the parts in different positions, Figure 4 is a perspective view illustrating some of the mechanism employed for the selection of automatic noughts, Figure 5 is a view similar to that of Figure 4, but showing certain other of the mechanism cooperating therewith and illustrating the parts in their normal rest position, Figures 6 and 7 are views similar to Figure 5 but show the parts in different positions.

Referring to the drawings the apparatus shown therein is for co-operation with an interpreter in which data is sensed from a perforated record card and a reproduction of the data so sensed is automatically printed either on the card from which sensing is effected or on another card. It will however be understood that the apparatus according to the invention can be employed with statistical machines other than interpreters in which printing is to be effected as the result of the sensing of statistical records.

In Figure 2 is diagrammatically illustrated a portion of a machine bed 1 along which, after being sensed by sensing mechanism of any suitable known form, not shown, the cards are fed by pairs of feeding rollers 2 to a position at which, in known manner, the cards are arrested for the printing operation. Above the bed of the machine is supported a plurality of rotatable type wheels 3, one for each card column, and around the periphery of the type wheels are spaced type characters to be selected for a printing operation. In the example being described the type-wheels are each provided with forty-one type characters. Below the type-wheels, for operation in known manner, are provided hammers 4 which, when fired, press the card against the type-wheels so that an impression is taken therefrom.

The type-wheels each, in known manner, consist of a gear wheel, the type characters being formed on the tops of the teeth 5 thereof. The teeth 5 of the type-wheel mesh with a gear wheel 6 freely rotatable on a shaft 7 and having secured thereto a pinion 8, the teeth of which mesh with rack teeth 9 formed on a type character selector member 10.

The type character selector member 10 comprises a slide supported for lengthwise reciprocation by combs 11 (see Figure 1A) and the pinion 8. A restoring bar 12 co-operates with the selector member 10 and is operated from the main drive of the machine in any suitable manner, not shown. To the forward end of the restoring bar is secured a depending plate 13, Figure 1A, and springs 14 are connected to the plate 13 and to the rear end of the selector member 10 so that as the restoring bar 12 is moved to the right, as viewed in Figures 1, 1A, and 2, the selector member 10 tends to follow the restoring bar if, as described below, it has been released to permit it to advance to a character selecting position.

On the upper edge of the character selector member 10 is formed a stop-engaging projection 15 to engage one of a number of stops, as described below, and so arrest a selector member in type character selecting position. The selector member is retained in its primary of starting position, as shown in Figure 2, by a latch 16 which engages in a tooth 17 formed at the forward end of the selector member. The latch 16 is supported for lengthwise sliding movement by the upper comb 11 and by a block 18, Figure 1A, and is urged towards the selector member by a spring 19.

Above the path of the selector member 10 are disposed a number of stops each of which comprises two selector member arresting portions 20 and 21. The portions 20 and 21 are mounted for lengthwise movement relative one to the other and are retained in their normal relative positions, as illustrated in Figures 1 and 2, by springs 22. As can be seen from Figure 1 the portion 20 of one end stop has its upper end located in an opening or recess 23 formed in the upper end of the portion 21. Each of the portions 20 is provided with a projection 24 which slides in an opening or recess 25 in the portion 21 of the stop and abuts the bottom of the recess when the two portions of the stop are in their normal relative positions as illustrated in Figure 1. From Figure 1 it will be observed that the portion 20 of the extreme left hand stop, as viewed in Figure 1, is retained in position by reason of its end portion being located in the recess 23 on the portion 21 and the portions 20 of the remaining stops are retained in position relative to their portion 21 by location between successive portions 21.

Each of the portions 21 of the stops is pivoted at its upper end for swinging movement about a pin 26 which extends laterally from an interponent 27 supported for lengthwise sliding movement by plates 28, 29, the stops being so pivoted that they can swing about their pivots in a direction extending lengthwise of the direction of movement of the selector member 10. The stops are also guided for lengthwise movement by lateral projections 30 formed on a guide 31 supported for movement lengthwise of the path of the selector member 10 by the upper comb 11 and a further comb member 32. The stops are actuated by impulses initiated, in known manner, by a record sensing operation effected by sensing mechanism, not shown, but which may comprise a device including sensing pins or which may be an electrical sensing device as is well understood in the art. The apparatus shown in the drawings is arranged for operation as the result of a sensing operation effected by sensing pins in which the sensing pins, not shown, in known manner, operate Bowden wires which, in turn, actuate plungers 33, Figure 1, the plungers on actuation thereof, operate further Bowden wires 34 which, through reciprocable pins 35, supported in plates 36, 37 actuate the interponents 27 against the action of springs 38 surrounding pins 39 co-operating with the interponents 27 in known manner. As can be seen from Figure 1, nine stops are connected to interponents 27 as just described and, at the extreme right hand end of the column, as viewed in Figure 1, there is provided a tenth stop which, as can be seen from the drawing, is permanently disposed in the path of the projection 15 on the selector member 10 to determine the three extreme positions of advancement of the selector member. The end stop also comprises portions 20, 21 but the portion 21 in this instance is not pivoted to an interponent but is pivoted about a pin 40 extending from a fixed member 41. The nine stops which are pivoted to interponents 27 correspond to the one to nine positions in a vertical column of a record card.

The primary or normal position of the guide 31 is illustrated in Figure 2 and it is retained in this position by a first control slide 42, Figure 1, supported for lengthwise sliding movement by a plate 43 and guide 44. The first control slide is urged to guide arresting position by a pin 45 and spring 46. When the guide 31 is in its primary or normal position, the first control slide 42 is abutted by a first abutment 47 extending laterally from the guide 31. When the guide 31 is in its primary position, as illustrated in Figure 2, if one of the stops should receive an impulse from its co-operating Bowden wire 34, both portions 20 and 21 will be moved into the path of the projection 15 on the selector member 10 as shown at position A in Figure 1, so that when the restoring bar 12 is actuated to permit the selector member 10 to advance to the right as viewed in Figure 1, the restoring member will be moved to the end of its stroke as illustrated in that figure and the projection 15 will abut against the portion 20 of the stop, as indicated at A, and will be arrested thereby so that, through the gear train above described, the type-wheel will be rotated to select the figure character seven which, in the apparatus being described, is the character represented by the stop at A when this stop is operated with the guide 31 in its normal position. It will be understood that the other eight interponent controlled stops would, if operated in similar circumstances, also represent their normal numerical values of one to six and eight and nine respectively. The portion 20 of the extreme right hand stop, when the guide 31 is in its normal position, is representative of the character nought.

In addition to the first control slide 42, there is provided a second control slide 48, a third control slide 49, and a fourth control slide 50. The control slides 48, 49, and 50 are each arranged to be actuated by an impulse initiated by a record sensing operation, the impulse being imparted thereto by further pins 35. If now, one of the stops is actuated simultaneously with one of the control slides 48, 49, or 50 the character to be selected on the type wheel 3 will be different from that which would be selected by the operation only of a stop with the guide 31 in its normal position. Thus, if the control slide 48 is actuated, the operation thereof causes the first control slide 42 to be retracted from engagement with the abutment 47 so that, under the influence of a pin 51 and spring 52, the guide 31 advances to the right, as viewed in Figure 1, until a second abutment 53, on the guide 31 abuts against the second control slide 48. The movement of the guide 31 will, of course, cause the stops to be swung about their pivots 26, 40 so that any one thereof which is actuated will be in a different selector member arresting position from that which it occupies if operated when the guide 31 is in its normal or primary position.

On actuation of the second control slide 48, a pin 54 extending laterally therefrom depresses one arm of a two-armed lever 55 freely pivoted on a spindle 56 so that the other arm thereof, which engages a pin 57 on the first control slide 42, raises the first control slide 42 and retracts it from engagement with the abutment 47 to permit the guide 31 to advance due to the action of pin 51 and spring 52. The guide 31 is, however, not free to advance until it is released by a restoring bar 58 which is urged by a spring 59 to follow the movement of advance of the restoring bar 12. At the end of its advance movement the restoring bar 58 is arrested by an end 60 of the comb 32, the restoring bar 12 continuing its forward movement to the postion shown in Figure 1. On the return movement of the restoring bar 12, as it again approaches the restoring bar 58, plates 61 mounted on the bar 12 at opposite ends thereof for movement therewith engage the restoring bar 58 and move it to the left, as viewed in Figure 1, so that it, in turn, picks up the guide 31 and returns it to its normal or primary position. At this time, any actuated control slide 48, 49, or 50 has been restored and so, as the abutment 47 passes from beneath the first control slide 42, the latter is moved into the path of the abutment 47 to again retain the guide 31 in its normal or primary position.

In the event that the third control slide 49 is operated simultaneously with one of the stops, the control slide 49 is moved downwards into position to be engaged by a third abutment 62 on the guide 31. A slot 63 near the lower end of the control slide 49 is engaged with a pin 64 extending laterally from one arm of a control lever 65 freely pivoted on a spindle 66, the other arm of the control lever 65 being engaged by a second pin 67 on the first control slide 42. Accordingly, on actuation of the third control slide 49, the first control slide 42 is retracted from engagement with the abutment 47 and, on advancement of the restoring bar 58, the guide 31 advances to the right, as viewed in Figure 1, until the abutment 62 engages the third control slide 49. From Figure 1 it will be observed that the distance advanced by the guide 31 from its normal position to engagement with the third control slide is one half the distance moved thereby from the primary position thereof when its abutment 53 engages the second control slide 48. It will, therefore, be understood that by reason of the mechanism so far described, each selector member engaging portion 20 of the stops can be selectively positioned so as to be engaged by the projection 15 on the selector member 10 in a selected one of three different positions.

On operation of the fourth control slide 50 as a result of an impulse imparted thereto by its co-operating Bowden wire 34 and pin 35, relative movement is effected between the portions 20 and 21 of the stops so that only the portion 21 of a stop will be positioned for abutment by the projection 15 on the selector member 10 as is illustrated at B in Figure 3. The fourth control slide 50 has a slot 68 near its lower end which co-operates with a pin 69 extending laterally from one arm of a bell crank lever 70 freely mounted on a spindle 71. The other arm of the bell crank lever 70 is pivotally connected with one end of a cam bar 72 which is supported at its other end by a pivotal connection 73, Figure 1A, to a link 74 freely pivoted on a spindle 75. As can be seen from Figures 1 and 3, the cam bar 73 is provided with a sloping cam face 76 for each of the stops and the cam faces 76 are arranged to co-operate with pins 77 extending laterally from the portions 20 of the stops. On actuation of the fourth control slide 50, the bell-crank 70 and link 74 are moved angularly in a clockwise direction, as viewed in Figure 1, thereby raising the cam bar 72 so that the pins 77 on the portions 20 of the stops rest against the top edge of the cam bar 72 as shown in Figure 3. Accordingly, if simultaneous impulses are received by a stop and the control slide 50 the cam bar 72 prevents the portion 20 of the actuated stop from being moved into the path of the selector member 10 and the portion 21 thereof only is positioned for engagement by the projection 15 on the selector member 10 as indicated at B, Figure 3.

From Figure 1, it will be observed that the fourth control slide 50 is provided with a projection 78 which overlies and engages a projection 79 on the second control slide 48. Accordingly, on actuation of the fourth control slide 50, the second control slide 48 is simultaneously actuated so as to retract the first control slide 42 and permit the guide 31 to be advanced so that the second abutment 53 thereon is arrested by the second control slide 48.

From the foregoing, it will be understood that, by reason of the provision for relative movement between the parts 20 and 21 of the stops, as just described, there is provided a fourth selector member arresting position at which any one of the stops may be arranged to arrest the selector member. Since, therefore, there are ten stops, including the extreme right hand stop as shown in Figure 1, each of which stops can be selectively disposed in one of four selector member arresting positions, provision is made for forty different character selecting positions of the selector member 10. Thus the type-wheels 3 are each provided with forty characters for selection by the selector member 10 and each is also provided with a further character, preferably a horizontal dash, this last character position being that which is disposed in printing position when no selection has been made. It will, of course, be understood that, if desired, this forty-first position may be a blank position so that if the hammers are fired with the type-wheels in such positions no character is printed.

The apparatus according to the invention is also provided with mechanism whereby, at the will of the operator, any one column can be set for the automatic printing of a nought irrespective of whether any stop in that column may be actuated. This mechanism is illustrated in Figures 1, 1A, 4, 5, 6, and 7 and comprises a manually operable control lever 80 freely pivoted on a spindle 81, Figure 1A, the spindle 81 extending through a fixed comb 82, the tines or teeth of which serve to space the control levers 80. In Figure 1A, the foremost control lever 80 is shown in its actuated position and the rear lever 80 for the type character selecting apparatus for the next column is shown in the position it occupies when the automatic nought mechanism for that column is not selected for operation. Each control lever 80 is retained in its operative or inoperative position, as is customary, by a spring 83 co-operating with a detent formed in the control lever. Pivoted at 84 to the control lever 80 is one end of an operating arm 85, the other end normally resting on the upper surface of the block 18 so that on movement of the control lever 80 it is free to slide between the latches 16. Each operating arm 85 is provided with a bend over portion to provide a lateral extension 86 which is of a length such as to overlie the arm 85 in the column of next higher denomination, see Figures 4 to 7.

Each operating arm 85 has a lateral pin 87 on which is freely pivoted a plate 88 connected with its control lever 80 by a spring 89. The plate 88 has a curved edge portion 90 for engagement by an operating bail 91 secured to a spindle 92 operated by any suitable means, not shown, from the main drive of the machine. The plate 88 is also provided with a projection 93 for engagement with a lug 94 on the latch 16 and a pin 95 projects laterally from the latch 16 for engagement by the operating arm 85 in the column of next lower denomination thereto. It will be understood that the latch 16 must always be retracted from engagement with the tooth 17 in the selector member 10 before the member 10 can advance to be arrested by one of the stops and, in the event that no stop in a column is actuated by an impulse as above described, the downward movement of the stop will cause a lateral projection, formed as a pin 96, Figure 1, on the portion 21 of the stop, to depress a trip bar 97 to the position shown in Figures 1 and 1A. The trip bar is pivotally connected at one end with a link 98, Figure 1, freely mounted on a spindle 99 and at the other end with one arm of a bell crank lever 100, Figure 1A, freely pivoted on a spindle 101. The other arm of the bell crank 100 is engaged by a pin 102 extending laterally from the latch 16 so that as the bell crank 100 is turned in a counter-clockwise direction, as viewed in Figure 1A, the latch 16 is retracted thereby from engagement with the tooth 17. The bell crank 100 and trip bar 97 are urged to their normal inactive position by a spring 103 so that, as a stop is restored, the trip bar is also restored and the latch 16 is returned to latching engagement with the tooth 17 when the restoring bar 12 returns the selector member 10 to its normal or primary condition.

It will be understood that there is a column of type character selecting mechanism, as herein described for each of the columns of a record card to be sensed thus, for example, if the records to be sensed comprise forty column cards, there will be forty columns of type character selecting mechanism, or, if the cards are sixty-five or eighty column cards, then there will be sixty-five or eighty columns of type character selecting apparatus.

If no automatic noughts are to be printed none of the control levers 80 are moved to their operating or down position as shown in Figure 1A and consequently the selector members 10 will only be permitted to advance when operation of one of the stops in a column has caused retraction of the latch from engagement with the tooth 17 on the member 10. When, however, in any of the columns the control levers 80 have been depressed to the down position as shown in Figures 1A, 5, 6, and 7, the operating arms 85 connected therewith are moved, to the left as viewed in Figure 1A, to be located between the latches 16 so that they lie beneath the pins 95 and the projections 93 on the plates 88 rest against the lugs 94 on the latches. In this position the plates 88 are located relative to the arms 85 by pins 104 which extend from the plates 88 and engage the under edges of the arms 85. The springs 89 retain the plates 88 in this position. Now when a stop is operated in any column, the latch 16 for that column will be lifted by its bell crank 100 and will also raise the projections 93 on the plate 88 against the action of the spring 89 which is thereby extended. The lower edge 90 of the plate is by this movement disposed above the bail 91 so that on operation of the bail in a clockwise direction, as viewed in Figure 1A, those plates 88 which are aligned therewith are engaged thereby and are raised together with the operating arms 85 with which they are connected. The raising of the arms 85 also causes the latches 16 with which they co-operate through pins 95 to be raised thus, in each column where a latch 16 is so raised and in which no stop has been actuated, the selector member 10 will advance until the projection 15 thereon is arrested by the portion 20 on the last stop which, as stated above, is permanently disposed in the path of the projection 15, unless it is elevated by the cam bar 72.

It may, in some instances, be desired that in some columns the selector members 10 be prevented from advancing even though, during the operation of the apparatus a stop may be actuated in that column. To prevent operation of the selector members in such circumstances, a manually operable cut-out device is provided for each column and this cut-out device comprises a manually operable control lever 105 freely pivoted on a spindle 106 in a comb 107 and to the lever is connected one end of a link 108, the other end of which is connected to one arm of a bell crank 109 freely mounted on a spindle 110, the other arm of the bell crank having a catch 111 slidable in the upper comb 11, see Figure 1A. The catch 111 is disposed in advance of the latch 16 and is arranged to be abutted by an abutment tooth 112 disposed in advance of the tooth 17.

It will be understood that the catch 111 can be applied only when the selector member 10 is in its normal or primary position, but that when the catch is interposed in the path of the abutment tooth 112 the selector member is prevented from advancing even though its latch 16 may be retracted from the tooth 17.

Although in the foregoing description the selector member 10 has been described as selecting characters on type-wheels 5 it will be understood that, if desired, the selector members 10 may select characters on straight type bars, or on type-carrying sectors, or type characters may be provided on the selector member itself.

I claim:

1. For a record controlled statistical machine incorporating type characters for effecting a printed record of data sensed from a record, type character selecting apparatus comprising a column of settable stops supported for actuation by impulses initiated by a record sensing operation and for swinging movement, a selector member to traverse said stops and be arrested thereby in character selecting position, a guide member supported for movement lengthwise of the path of the selector member, projections on the guide member to engage the stops and effect swinging movement thereof, a restoring member to restore the guide member to its primary position after operation of the selector member, abutments on said guide member, a first, a second, and a third control slide to co-operate with said abutments on actuation by impulses initiated by a record sensing operation, said first control slide being normally retained in the path of its co-operating abutment to retain said guide member in the primary position thereof, and connecting means connecting the first control slide with each of said second and third control slides to effect movement of the first control slide from the normal position thereof on actuation of one of the second and third control slides to permit movement of the guide member to cause co-operation between the appropriate abutment thereon and the actuated one of the second and third control slides.

2. For a record controlled statistical machine incorporating type characters for effecting a printed record of data sensed from a record, type character selecting apparatus comprising a column of settable stops supported for actuation by impulses initiated by a record sensing operation and for swinging movement, each said stop consisting of two portions movable relatively one to the other against the action of a restoring spring for engagement by a selector member, a selector member to traverse said stops and be arrested thereby in character selecting position, a guide member supported for movement lengthwise of the path of the selector member, projections on the guide member to engage the stops and effect swinging movement thereof, a restoring member to restore the guide member to its primary position after operation of the selector member, abutments on said guide member, a first, a second, and a third control slide to co-operate with said abutments on actuation by impulses initiated by a record sensing operation, said first control slide being normally retained in the path of its co-operating abutment to retain said guide member in the primary position thereof, connecting means connecting the first control slide with each of the second and third control slides to effect movement of the first control slide from the normal position thereof on actuation of one of said second and third control slides to permit movement of the guide member to cause co-operation between the appropriate abutment thereon and the actuated one of the second and third control slides, a cam plate co-operating with said stops to effect relative movement between the two portions thereof to permit one portion only of a stop to be interposed in the path of the selector member, a fourth control slide for actuation by an impulse initiated by a record sensing operation to control operation of the cam plate, and coupling means connecting the fourth control slide with one of the second and third control slides to effect operation of said first control slide simultaneously with the operation of the cam plate.

3. Apparatus according to claim 2, including a last stop, considered in the direction of advance of the selector member, said last stop consisting of two portions movable relatively one to the other against the action of a restoring spring, being supported for swinging movement under control of said guide member, and controlled by said cam plate whereby one portion of the last stop is at all times disposed in the path of the selector member to determine a maximum position to which the selector member can advance.

4. Apparatus according to claim 2, including a latch to retain the selector member in the primary position thereof, a latching tooth on the selector member for co-operation with said latch, a projection on each said stop, a trip bar operable by said projection on movement of the stop to the selector member arresting position thereof, and a trip member connecting said latch and trip bar whereby the latch is disengaged from the selector member on operation of the trip bar.

5. Apparatus according to claim 3, including a latch to retain the selector member in the primary position thereof, a latching tooth on the selector member for co-operation with said latch, a projection on each said stop, a trip bar operable by said projection on movement of the stop to the selector member arresting position thereof, and a trip member connecting said latch and trip bar whereby the latch is disengaged from the selector member on operation of the trip bar.

6. Apparatus according to claim 5, including selectively operable connecting means connecting said latch with the similar latch for another column of stops, said connecting means on being conditioned for operation permitting simultaneous delatching of the selector members co-operating with the latches so connected.

7. Apparatus according to claim 6, wherein the selectively operable connecting means comprises a pin extending laterally from the latch, a freely pivoted control lever, an operating arm freely pivoted on said control lever for co-operation with said pin, a plate freely pivoted on the operating arm, a spring connecting said plate with the control lever, a lug on said latch, a projection on said plate to co-operate with said lug, a lateral extension on the operating arm to overlie the operating arm of the column of next higher denomination, and a rocking operating bail disposed beneath the plates for plurality of adjoining columns.

8. Apparatus according to claim 4, including an abutment tooth on said selector member, said abutment tooth, considered in the direction of advance of the selector member, being disposed in advance of said latching tooth, and a normally retracted manually operable settable catch to co-operate with said abutment tooth to restrain the selector member against advancement on retraction of the catch from said latching tooth.

9. Apparatus according to claim 5, including an abutment tooth on said selector member, said abutment tooth, considered in the direction of advance of the selector member, being disposed in advance of said latching tooth, and a normally retracted manually operable settable catch to co-operate with said abutment tooth to restrain the selector member against advancement on retraction of the catch from said latching tooth.

10. Apparatus according to claim 7, including an abutment tooth on said selector member, said abutment tooth, considered in the direction of advance of the selector member, being disposed in advance of said latching tooth, and a normally retracted manually operable settable catch to co-operate with said abutment tooth to restrain the selector member against advancement on retraction of the catch from said latching tooth.

11. For a record controlled statistical machine incorporating type characters for effecting a printed record of data sensed from a record, type character selecting apparatus comprising a column of settable stops for actuation by impulses initiated by a record sensing operation, a type character selector member to traverse said stops and be arrested thereby in character selecting position, a latch to retain the selector member in the primary position thereof, a latching tooth on the selector member for co-operation with said latch, a projection on each said stop, a trip bar operable by said projection on movement of the stop to the selector member arresting position thereof, a trip member connecting said latch and trip bar whereby the latch is disengaged from the selector member on operation of the trip bar, guide means to guide the stops for movement into and out of the path of the selector member, and control means actuated by impulses initiated by a record sensing operation selectively to dispose a stop in one of a plurality of selector member arresting positions.

12. For a record controlled statistical machine incorporating type characters for effecting a printed record of data sensed from a record, a type character selecting apparatus comprising a column of settable stops supported for actuation by impulses initiated by a record sensing operation and for swinging movement, a selector member to traverse said stops and be arrested thereby in character selecting position, a latch to retain the selector member in the primary position thereof, a latching tooth on the selector member for co-operation with said latch, a projection on each said stop, a trip bar operable by said projection on movement of the stop to the selector member arresting position thereof, a trip member connecting said latch and trip bar whereby the latch is disengaged from the selector member on operation of the trip bar, a guide member supported for movement lengthwise of the path of the selector member, projections on the guide member to engage the stops and effect swinging movement thereof, a restoring member to restore the guide member to its primary position after operation of the selector member, abutments on said guide member, and control means actuated by impulses initiated by a record sensing operation selectively to co-operate with said abutments thereby to determine the extent of swinging movement of the stops.

13. Apparatus according to claim 12, including an abutment tooth on said selector member, said abutment tooth, considered in the direction of advance of the selector member, being disposed in advance of said latching tooth, and a normally retracted manually operable settable catch to co-operate with said abutment tooth to restrain the selector member against advancement on retraction of the catch from said latching tooth.

References Cited in the file of this patent

UNITED STATES PATENTS

| | | |
|---|---|---|
| 1,391,959 | Lasker | Sept. 27, 1921 |
| 2,290,827 | Thomas | July 21, 1942 |
| 2,291,970 | Neumann-Lezius | Aug. 4, 1942 |
| 2,323,836 | Mueller | July 6, 1943 |
| 2,535,151 | Mixer | Dec. 26, 1950 |
| 2,562,232 | Braun | July 31, 1951 |
| 2,591,128 | Broughham | Apr. 1, 1952 |